United States Patent
Fredericks et al.

(10) Patent No.: US 7,118,261 B2
(45) Date of Patent: Oct. 10, 2006

(54) WHITE POSITION TAILLIGHT FOR AIRCRAFT

(75) Inventors: Thomas M. Fredericks, Westbrook, CT (US); Todd J. Smith, Deep River, CT (US)

(73) Assignee: Whelen Engineering Company, Inc., Chester, CT (US)

(*) Notice: Subject to any disclaimer, the term of this patent is extended or adjusted under 35 U.S.C. 154(b) by 180 days.

(21) Appl. No.: 10/718,767

(22) Filed: Nov. 21, 2003

(65) Prior Publication Data

US 2005/0128759 A1 Jun. 16, 2005

(51) Int. Cl.
*F21S 8/10* (2006.01)

(52) U.S. Cl. .................. 362/545; 362/549; 362/252; 362/470

(58) Field of Classification Search .................. 362/47, 362/470, 230, 231, 545; 340/945, 955
See application file for complete search history.

(56) References Cited

U.S. PATENT DOCUMENTS

| | | | |
|---|---|---|---|
| 4,912,334 A | 3/1990 | Anderson | 250/495 |
| 5,567,036 A * | 10/1996 | Theobald et al. | 362/485 |
| 5,803,579 A | 9/1998 | Turnbull et al. | 362/83.1 |
| 5,806,965 A | 9/1998 | Deese | 362/249 |
| 6,132,072 A | 10/2000 | Turnbull et al. | 362/494 |
| 6,220,722 B1 | 4/2001 | Begemann | 362/231 |
| 6,257,737 B1 | 7/2001 | Marshall et al. | 362/231 |
| 6,431,728 B1 | 8/2002 | Fredericks et al. | 362/249 |
| 6,509,832 B1 | 1/2003 | Bauer et al. | 340/425.5 |
| 6,520,669 B1 | 2/2003 | Chen et al. | 362/545 |
| 6,523,976 B1 * | 2/2003 | Turnbull et al. | 362/231 |
| 6,533,445 B1 * | 3/2003 | Rogers | 362/540 |
| 6,550,949 B1 | 4/2003 | Bauer et al. | 362/545 |
| 6,554,452 B1 | 4/2003 | Bourn et al. | 362/247 |
| 6,669,357 B1 * | 12/2003 | Konicke et al. | 362/470 |
| 2003/0072157 A1 | 4/2003 | Nolan et al. | 362/245 |

* cited by examiner

*Primary Examiner*—Ali Alavi
(74) *Attorney, Agent, or Firm*—Alix, Yale & Ristas, LLP (57) ABSTRACT

An aircraft position light employs selected colored LEDs to produce a white appearing warning light with a reduced light component in the amplification spectrum of night vision imaging equipment. A combination of amber and cyan LEDs are selected to produce approximately three amber flux units for every cyan flux unit resulting in a white composite light. Both of the selected LEDs have dominant wavelengths of less than 600 nm.

18 Claims, 8 Drawing Sheets

WHITE POSITION TAILLIGHT FOR AIRCRAFT

BACKGROUND OF THE INVENTION

1. Field of the Invention

The invention relates generally to external navigation lighting for aircraft and more particularly to an LED aircraft taillight that appears white but emits little or no light in the upper (red) portion of visible light spectrum and the just above visible spectrum (near infra red).

2. Description of the Related Art

Civilian air traffic control agencies such as the FAA specify standards for aircraft external lighting. Aircraft operating at night in civilian airspace are required to display lights to attract the attention of other aircraft operating in the same airspace. These external aircraft lights include flashing anticollision lights mounted on the aircraft's upper and lower fuselage, as well as steady burn position/navigation lights on the tail and the wing tips. The location, color, intensity and light radiation pattern for each particular light is typically specified by the relevant regulation.

Night vision imaging systems (NVIS) were introduced in the late 1960's and are now widely used by military and law enforcement personnel to enhance the effectiveness of aircraft during night operations. Night vision goggles (NVGs) are binocular-looking devices that can be attached to a flight helmet or a combat helmet and suspended in front of the eyes. NVGs are now widely appreciated as one of the best and most cost-effective ways to permit night operations in aircraft.

NVGs operate by greatly multiplying very low levels of existing light and then presenting the operator with a scene in front of his eyes that closely resembles a daytime scene. NVGs have made great advances in recent years in both their power to multiply existing light and their visual acuity. Modern NVGs amplify light in the upper visible (red) spectrum and the just-above-visible (near infrared) spectrum. This area of amplification will be referred to as the "NVG amplification spectrum." While NVG sensitivity is greatest in the just-above-visible/near infrared region, there is a significant sensitivity in the visible red region as well. Consequently, there is an overlap between the light frequencies that the unaided human eye sees and those light frequencies that NVGs respond to, e.g., the NVG amplification spectrum.

Most modern NVGs have a built-in filter that limits this overlap by making a cleaner NVG cutoff at the lower end of the NVG amplification spectrum. These NVGs are not sensitive to blue and green colored light. NVGs may also employ an automatic brightness control feature, which acts to decrease light amplification as input light levels increase. Automatic brightness control was designed to maintain a constant NVG scene brightness. Brightness control is initiated above a certain input light level threshold and reduces the light sensitivity of the goggles causing a corresponding decrease in system gain, and an overall loss of NVG-aided visual acuity. Higher levels of input light in the NVG amplification spectrum can reduce NVG performance and thus reduce the operator's ability to see a low light level nighttime scene.

Aircraft external lighting have previously been provided by "strobe" lights or incandescent lamps. An unfiltered incandescent bulb emits strongly in the near infrared spectrum. Strobe lights also produce a broad spectrum of light having significant components in the NVG amplification spectrum. Incandescent and strobe lamps also suffer from relatively short service life.

With advances in the intensity of light output from light emitting diodes (LEDs), it is now possible to replace incandescent and strobe lamps with LED light sources. LED light sources are attractive because of their extremely long service life and relatively low power consumption. Several high flux LEDs such as the Luxeon™ emitter from LUMILEDS™ of San Jose, Calif., in certain configurations, can achieve the required light output and radiation pattern for an aircraft position light. Recently developed white LEDs make it possible to produce a chromatically white LED aircraft position light meeting the requirements for intensity and radiation pattern. However, white LEDs emit significant light in the NVG amplification spectrum, and in particular display a spike in light emission at a wavelength of approximately 610 nm, very close to the red portion of the spectrum. As a result, aircraft position lights employing white LEDs are unacceptably bright in the NVG amplification spectrum.

Aircraft flying in civilian airspace are required to turn on their navigation lights. Navigation lights employing incandescent or LED light sources impair the effectiveness of aircrews equipped with NVGs due to the intensity of light emitted in the NVG amplification spectrum. FAA regulations requiring external aircraft lighting have been modified to permit military aircraft operation in military airspace without external lighting in recognition of this problem. It is possible to equip such navigation lights with filters that reduce the light output in the NVG amplification spectrum. However, these filters usually reduce the visible light output below the intensity specified by the relevant regulations. The filters also tend to shift the color chromaticity coordinates outside those permitted by the relevant regulations. In extreme cases it is known to turn off external lights, placing aircraft, aircrews and the public at risk.

There is a need in the art for an aircraft navigation light that provides the required chromaticity, light intensity and radiation pattern for a white position light and emits little or no light in the red and near infrared light spectrum.

SUMMARY OF THE INVENTION

An exemplary aircraft taillight in accordance with the present invention uses a combination of colored LED light sources to provide a position light that appears white to a viewer. The light radiated by the LEDs combines to produce a hue of light that appears white but does not include a significant component in the NVG amplification spectrum. One effective combination of colored LEDs is amber and cyan. The LEDs are combined to produce a amber and cyan light in a flux ratio of approximately three amber flux units for each cyan flux unit. An LED array employing amber and cyan LEDs in this ratio is then configured to provide the light intensity and radiation pattern specified for the particular position light.

One example is a position light configured for use as an aircraft taillight. An aircraft taillight is required to be a white light having a specified chromaticity (see FIG. 2, at 70) at an intensity of at least 20 candela over an arc of 140° centered on the tail of the aircraft. To comply with this standard, a support block includes two angled support surfaces to which PC boards are mounted. Each PC board includes a plurality of high flux LEDs mounted in a linear array. The linear array includes one amber LED on either side of a cyan LED. The LEDs are of the lambertian (high dome) lens configuration with a viewing angle of approximately 140°. Viewing angle is the off axis angle from the emitter optical axis where the luminous intensity is ½ of its peak value. Viewing angle is an industry standard indication of the radiation pattern of an LED emitter. A large viewing angle indicates a wide radiation pattern.

The support block fixes the PC boards at an included angle of approximately 90°. This angle may be an internal angle, producing a concave angled orientation (valley), or may be an external angle, producing a convex angled orientation (peak). In combination, the viewing angle of the LEDs and the included angle of the support block result in a radiation pattern that extends over an arc of 140° centered on the taillight. Each of the circuit boards includes two amber high-flux LEDs and one cyan high-flux LED. This combination of light sources meets FM requirements for intensity and approximates the required white color without significant light radiation having a wavelength in the NVG amplification spectrum.

The resulting position light is "NVG friendly" in that it does not emit large amounts of light that will degrade NVG performance when within the field of view of NVG equipped aircrew. This is particularly important for an aircraft taillight because, when aircraft fly in formation, the taillight will necessarily be in the field of view of those piloting aircraft in the rear of the formation. If the position lights in the field of view of the following aircraft emit excessive light in the NVG amplification spectrum, they must be switched off to avoid blinding NVG equipped aircrew.

An object of the present invention is to provide a new and improved aircraft position light that complies with FAA requirements for color, intensity and radiation pattern and does not emit significant light in the NVG amplification spectrum.

BRIEF DESCRIPTION OF THE DRAWINGS

This and other objects, features and advantages of the invention will become readily apparent to those skilled in the art upon reading the detailed description of the exemplary embodiment in conjunction with the accompanying drawings, in which.

DETAILED DESCRIPTION OF THE PREFERRED EMBODIMENT

Figure 1:
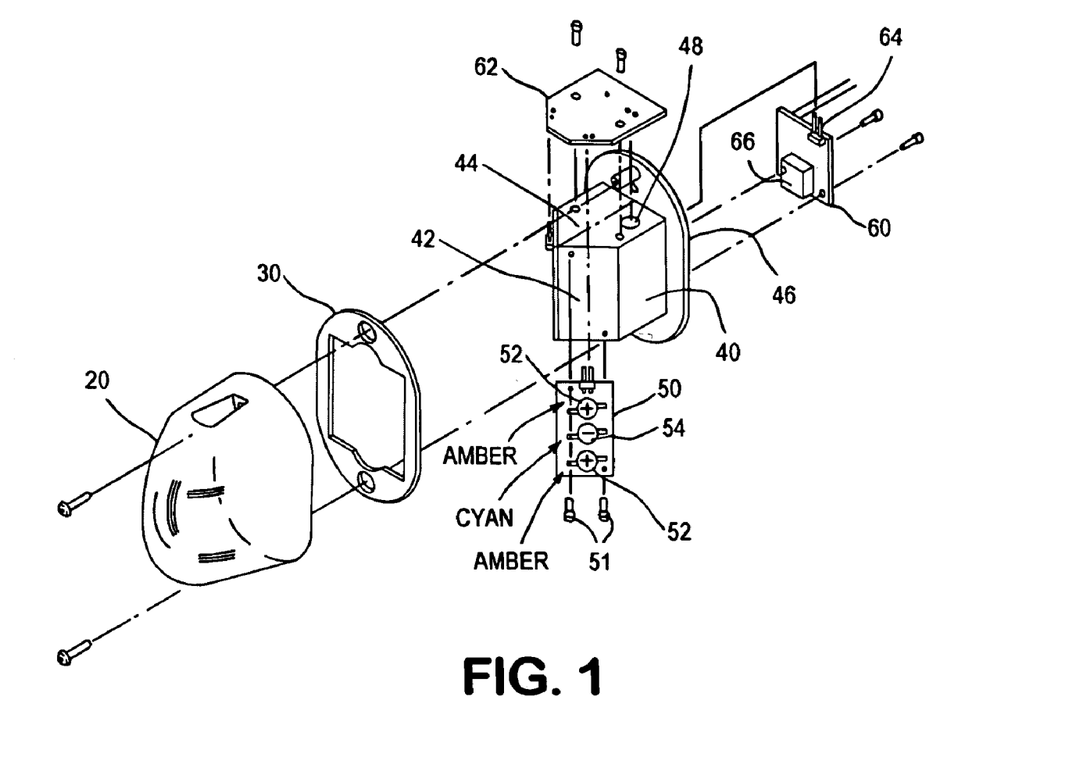
FIG. 1 is an exploded perspective view of an exemplary aircraft taillight illustrative of aspects of the present invention.
Figure 2:
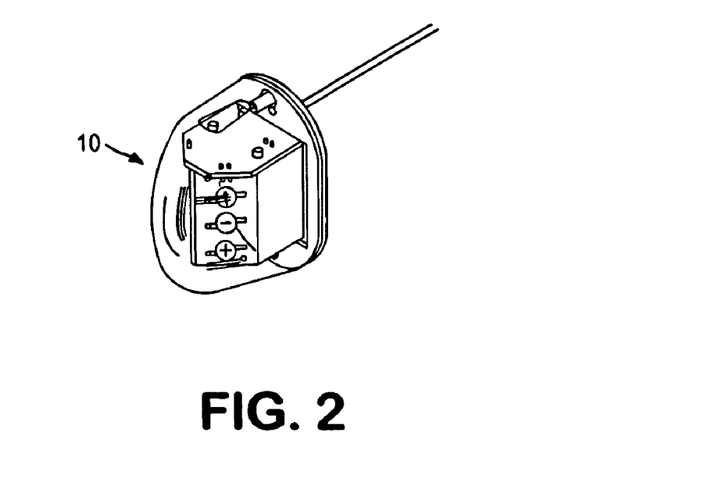
FIG. 2 is a perspective assembly view of the aircraft taillight of FIG. 1.
Figure 6A:
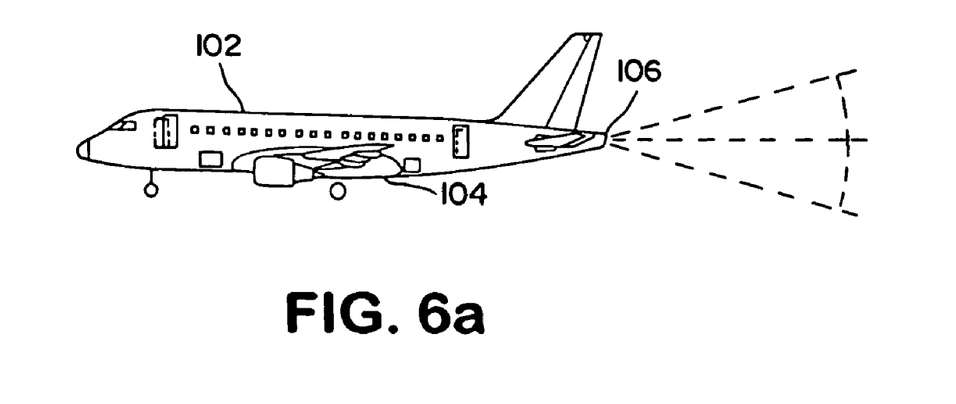
FIGS. 6a and 6b are exterior side and top views, respectively of an aircraft showing the locations for required external lights.
Figure 6B:
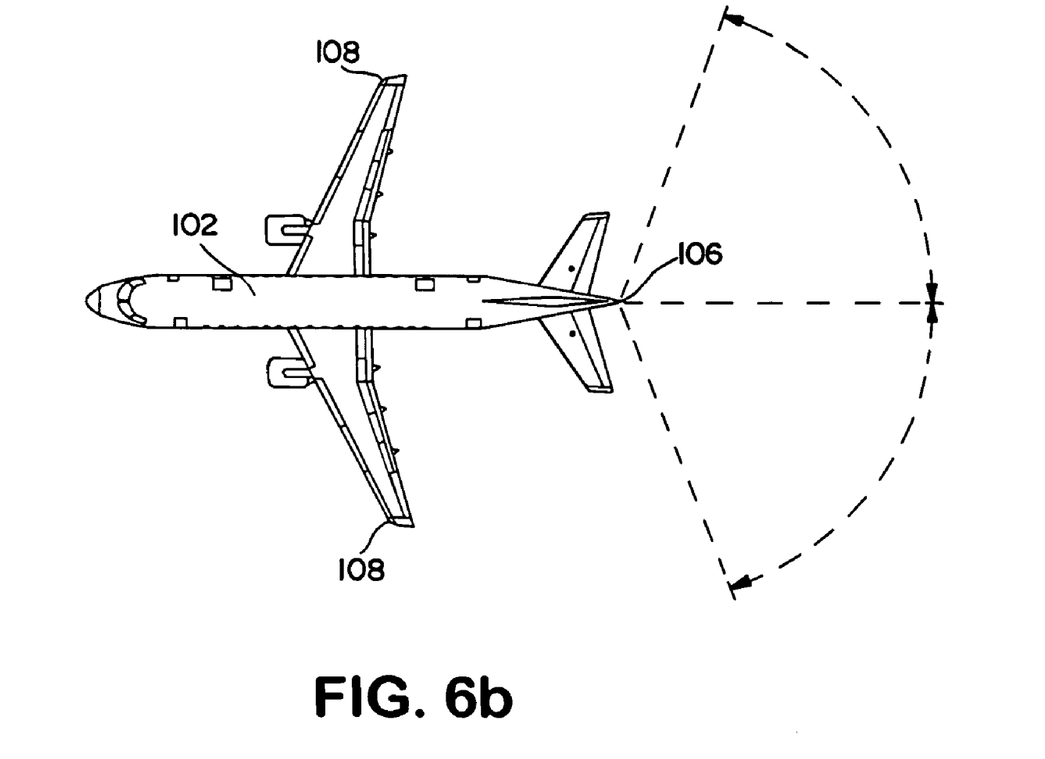

An exemplary embodiment 10 of a white position taillight for an aircraft is illustrated in FIGS. 1 and 2. With reference to FIGS. 6a and 6b, an aircraft taillight must be placed on the rearward most part of the aircraft as shown at 106. FM standards require a light radiation pattern that extends 70° (degrees) to the right and left of the aircraft centerline as shown in FIG. 6b. The standard requires a minimum light intensity of 20 candela over this arc in the plane of the aircraft. The required light intensity falls as the pattern moves further above or below the plane of the aircraft centerline as shown in FIG. 6a. The relevant aviation lighting standards also specify the chromaticity (apparent color) for the aircraft taillight.

Figure 3:
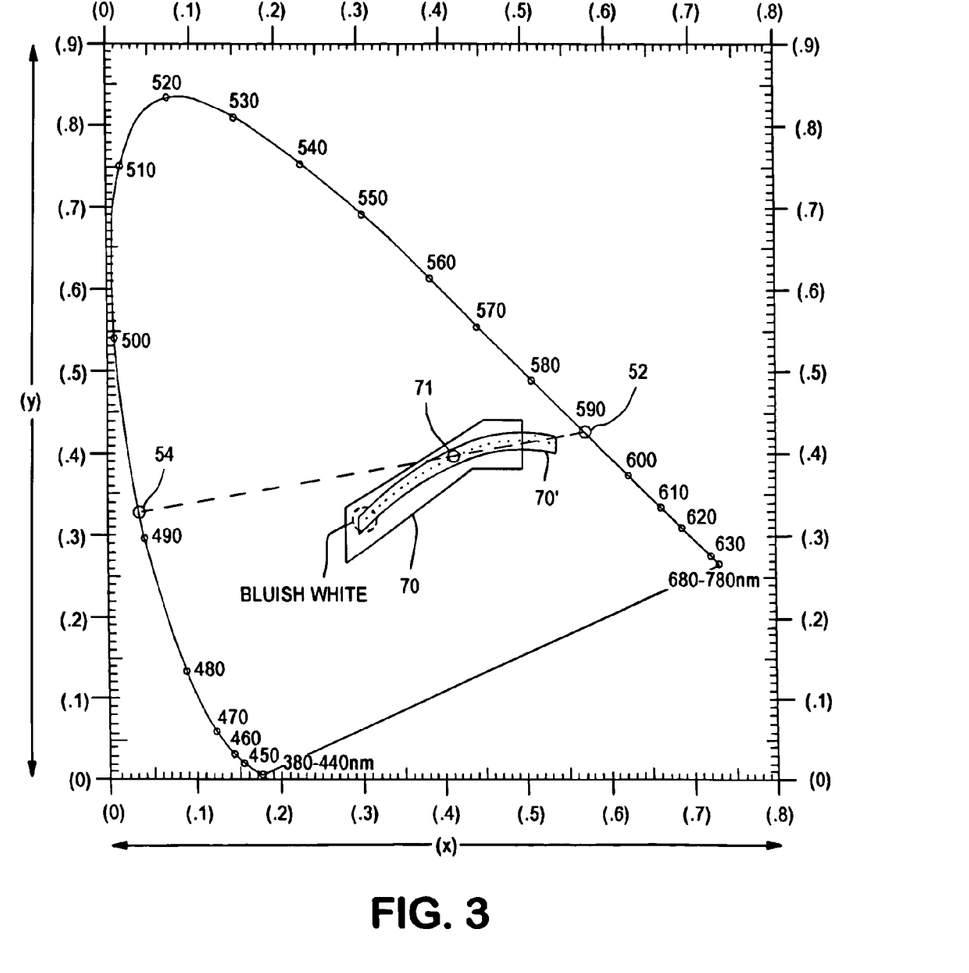
FIG. 3 is a CIE 1931 Chromaticity diagram annotated to indicate the chromaticity of light produced by LEDs in the aircraft taillight and the resulting composite light with respect to the required (specified) taillight color.
Figure 5:
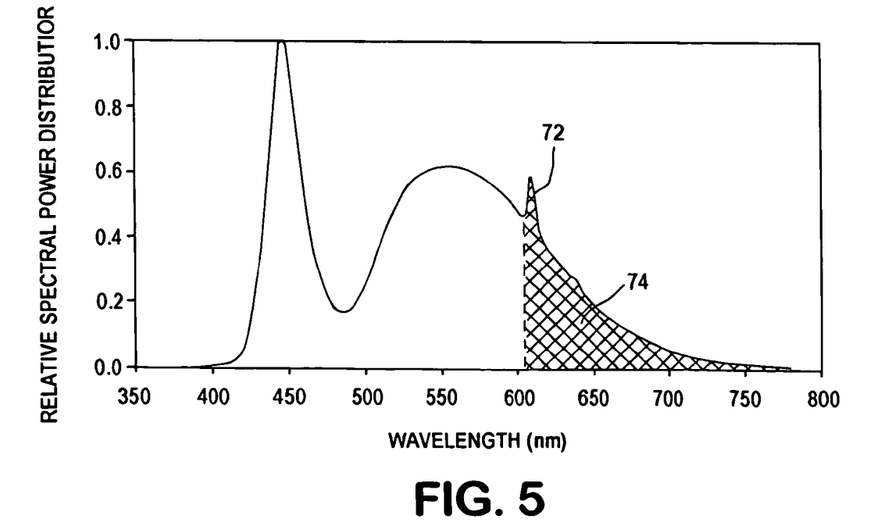
FIG. 5 is a graphical illustration of the relative spectral power distribution for a typical white LED.

An aircraft taillight must be "aviation white" with a chromaticity in the range bounded by line 70' in FIG. 3. In the CIE chromaticity chart of FIG. 3, the lower right-hand corner represents the overlap between the NVG amplification spectrum and the visible light spectrum. The chromaticity indicated as "bluish white" at the left-hand end of the aviation white range 70, 70' is the composite chromaticity of white LEDs presently available. FIG. 5 illustrates the relative spectral power distribution for a Luxeon™ white emitter manufactured by Lumileds™ of San Jose, Calif. FIG. 5 illustrates a spike 72 of light output at approximately 610 nm and the significant light output 74 of the white LED in a light wavelength above 610 nm. The light output pattern of a white LED causes it to appear very bright to an NVG. This brightness results in activation of the automatic brightness control feature of the NVG, effectively blinding NVG equipped aircrews.

Figure 4:
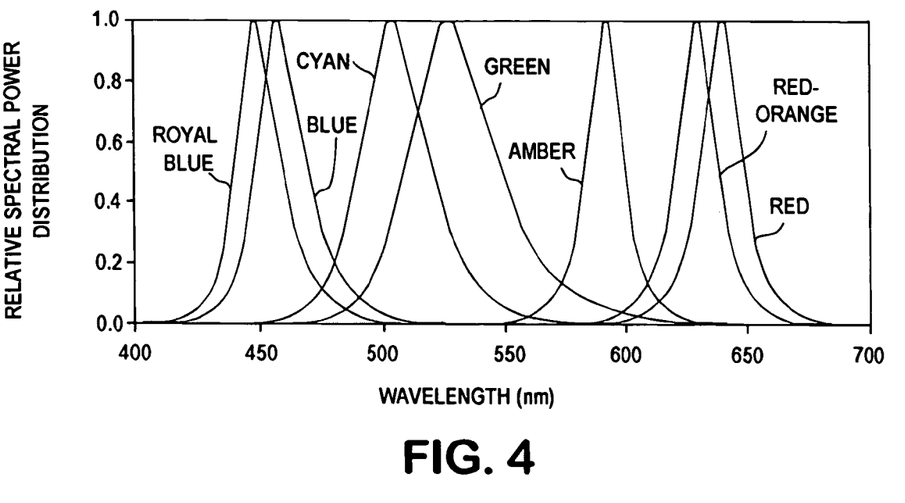
FIG. 4 is a graphical illustration of the relative spectral power distribution of LEDs of various colors.

LEDs typically emit light having a relatively narrow spectral band, with white LEDs being a notable exception. FIG. 4 illustrates the light output of various Luxeon™ emitters manufactured by Lumileds™ of San Jose, Calif. Each of the various colored LEDs emits a "pure" light, e.g., light within a narrow spectral band. An aspect of the invention relates to combining the light output of two colored LEDs having a dominant wavelength below 600 nm to produce a white LED position light that emits little or no light in the NVG amplification spectrum. In an exemplary embodiment, this goal is achieved by combining amber and cyan Lumiled® emitters in a ratio of two amber emitters to each cyan emitter. The current version of an amber Lumiled® emitter has approximately 1.4 times the radiometric power, or luminous flux, of a cyan Lumiled® emitter. The two to one LED ratio therefore produces a light flux ratio of approximately three amber flux units for every cyan flux unit. In this ratio of flux, these wavelengths produce a composite light hue at 71 on FIG. 3. As can be seen, this composite light hue 71 falls within the color range established by both the SAE and FAR for "white".

With reference to FIG. 3 it will be understood that the amber LED 52 has a chromaticity indicated at yellow (approximately 590 nm), while the cyan LED 54 has a chromaticity indicated in the blue-green range (approximately 492 nm). Combining LEDs having these colors in a pattern that results composite flux ratio of approximately three amber flux units for each cyan flux unit results in a composite light having a chromaticity 71 within the chromaticity range 70, 70' specified for aviation white by both the SAE (Society of Automotive Engineers) and the FAR (Federal Aviation Regulations). The composite light has a chromaticity center tolerance of approximately X=0.418 and Y=0.397. Since the component LEDs emit light in narrow spectral bands that do not include significant emission above 600 nm, the resultant composite light can be described as "NVG friendly." The term "NVG friendly" is intended to describe a light that, while visible to an NVG equipped aircrew, does not appear so bright as to reduce the sensitivity of the NVG by activating the automatic brightness control feature.

It will be understood that there is a natural variation in the dominant wavelength of light emitted and the radiometric power (total luminous flux) produced by any given LED selected from a production lot of LEDs. For example, a cyan LED dominant wavelength may vary from closer to a green color to closer to a blue color and its total luminous flux may vary from a low value to a high value. LED manufacturers mitigate this variability by sorting or "binning" their LEDs into subsets having similar dominant wavelengths and luminous power. Therefore, the values used for dominant wavelength and luminous flux used in this application should be understood to be representative values. Further, the amber/cyan flux ratio of three to one is given as an approximate value. This flux ratio can be expected to vary from 2.5 to as much as 3.5 amber flux units for every cyan flux unit because of the variations in the radiometric power of particular LEDs. Careful selection of LEDs can reduce this variability to acceptable levels. Process or material changes in LED manufacture will affect the performance of the product and may require altering the number, placement, type and/or numbers of LEDs for a particular composite light.

While amber and cyan LEDs are disclosed in the context of this application, other combinations of LEDs with light output below 600 nm are consistent with the invention described herein. For example, green and amber or blue and amber LEDs in a different ratio may produce a white appearing light with little or no output in the NVG amplification spectrum and are intended to be encompassed by this application.

With reference to FIGS. 1 and 2, a first exemplary embodiment of an aircraft position light 10 includes a thermally conductive support block 40 to which are mounted PC boards 50 bearing arrays of LEDs 52, 54. Since the light output pattern of the position light is specified to be symmetrical with respect to the aircraft centerline, the overall configuration of the exemplary position light 10 is also symmetrical. For example, the thermally conductive support block 40 defines two substantially planar surfaces 42. The planar surfaces 42 are arranged at an angle α (approximately 45°) to a vertical plane 41 passing through the support block 40. The vertical plane 41 passing through the support block corresponds to a vertical plane passing through the center of the aircraft.

Figure 7:
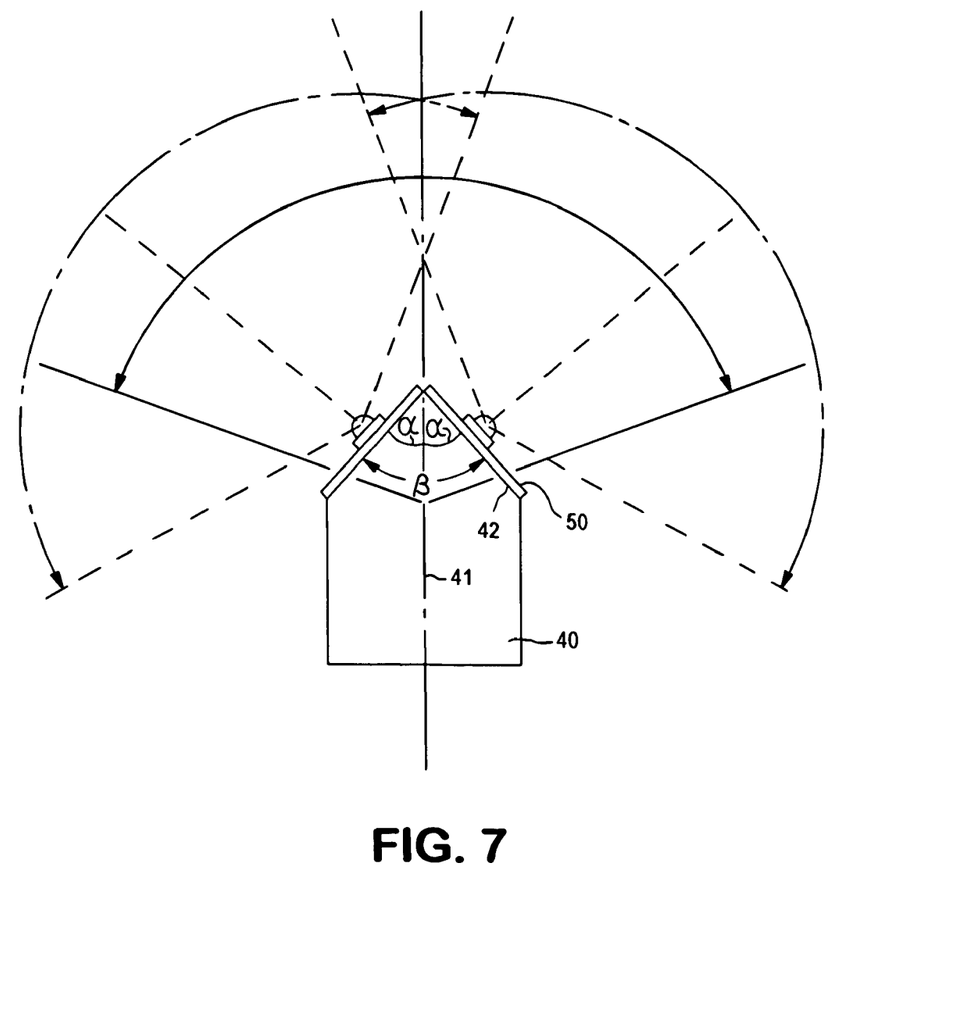
FIG. 7 is a top view of the support block and LED arrays illustrating the light emission pattern of an exemplary aircraft taillight.

The angular orientation of the surfaces 42 of the support block relative to this vertical plane 42 are selected to complement the light radiation pattern of the LEDs 52, 54. As best seen in FIG. 7, the light radiation pattern of each of the LEDs 52, 54 is in the form of a half-globe. The light radiation pattern for an LED depends on the lens shape and other factors. The first exemplary embodiment 10 utilizes a Luxeon™ emitter with a lambertian lens shape. This emitter has a viewing angle of 140. The term "viewing angle" describes the angle relative to the optical axis of the LED where the luminous intensity is one-half (½) of the peak value.

The standard for the aircraft taillight requires a light output of 20 candela over a range of 140 centered on the longitudinal axis of the aircraft (see FIG. 6b). What is important to note about the exemplary LED position light 10 is that the support surfaces 42 for the PC boards 50 are calculated to complement the radiation pattern of the LEDs used. These relationships are illustrated in FIG. 7. The support block angled surfaces of the exemplary embodiment define an included angle β of approximately 90°. This included angle β cooperates with the light radiation pattern from the LEDs to produce an overall light radiation pattern that meets FM specifications. As can be seen in FIG. 7, the wide angle light from each LED overlaps at the vertical plane of the aircraft. Even though the light output of individual LEDs at this relatively large angle from the optical axis of the LED is weak, the overlap in light emission allows a relatively few LEDs to produce the required 20 candela over the entire arc of 140°. In other words, the overlap in light emission from the two LED arrays improves the uniformity of light output directly behind the aircraft. Other types of LEDs having different light radiation patterns will likely require a support block with support surfaces tailored to those LEDs. The number and/or position of LEDs will vary depending on the intensity and light output pattern of the LEDs.

FIG. 1 is an exploded view showing the primary components of the exemplary position light 10. A metal base plate 46 and support block 40 provide structural support for the position light components. PC boards 50 configured to match the shape of the angled support block surfaces 42 carry LEDs 52, 54 and electrical circuitry for delivering electrical current to the LEDs 53, 54. In the exemplary embodiment each PC board 50 carries three LEDs. More specifically, each PC board 50 carries two amber Luxeon™ emitters 52 and one cyan Luxeon™ emitter 54. A connector PC board 62 is configured to mount to one end of the support block 40 to electrically connect the driver PC board 60 to the PC boards 50 mounted to the angled surfaces 42. Such electrical connection could also be accomplished by other known means, such as wires or the like.

Figures 9, 10, 11:
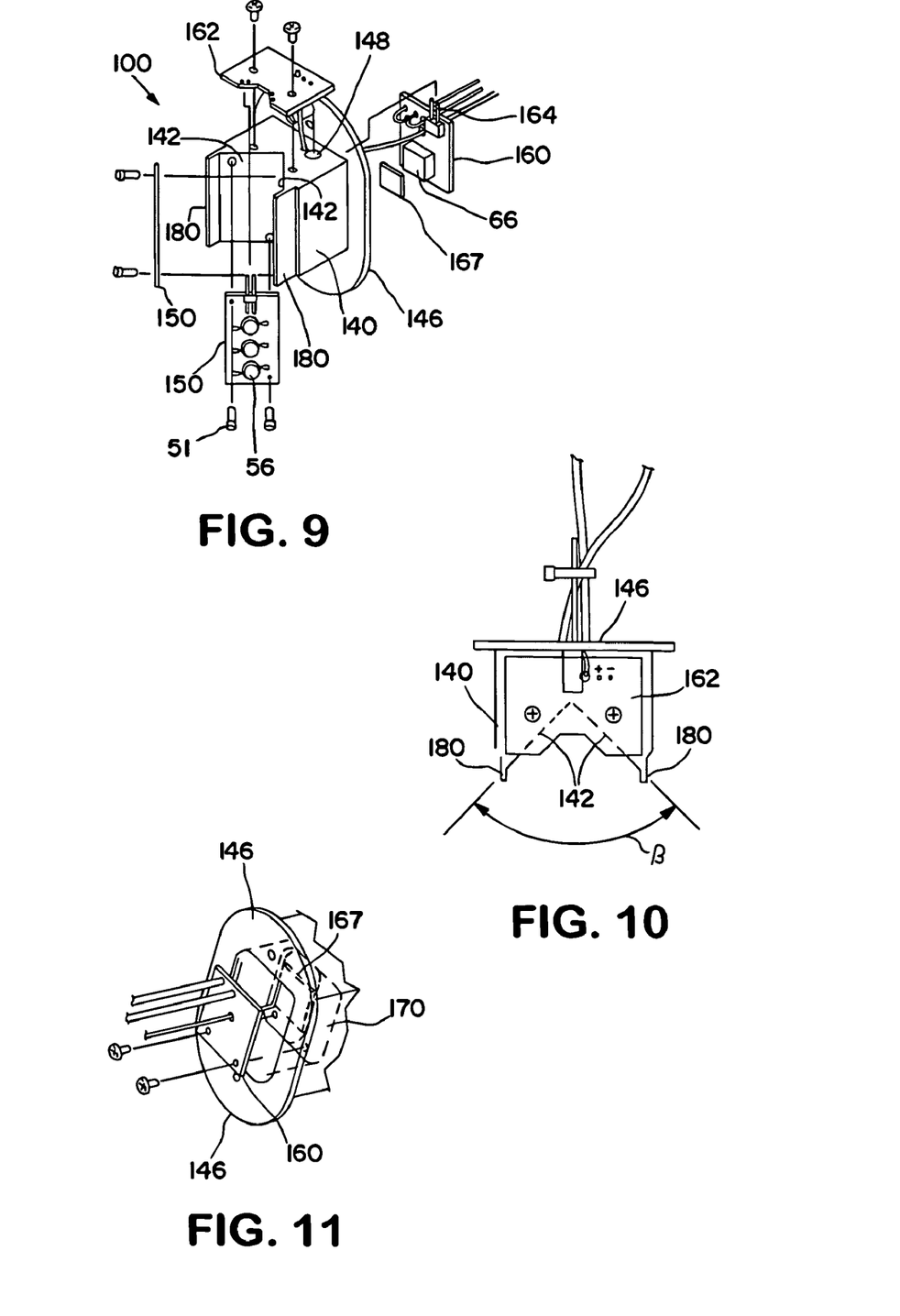
FIG. 9 is another, more completely exploded perspective view of light emitting component of the aircraft taillight of FIG. 8.
FIG. 10 is a top end view, partly in phantom, of the light emitting component of FIG. 9.
FIG. 11 is an exploded rear perspective view of the light emitting component of FIGS. 9 and 10.
Figure 12:
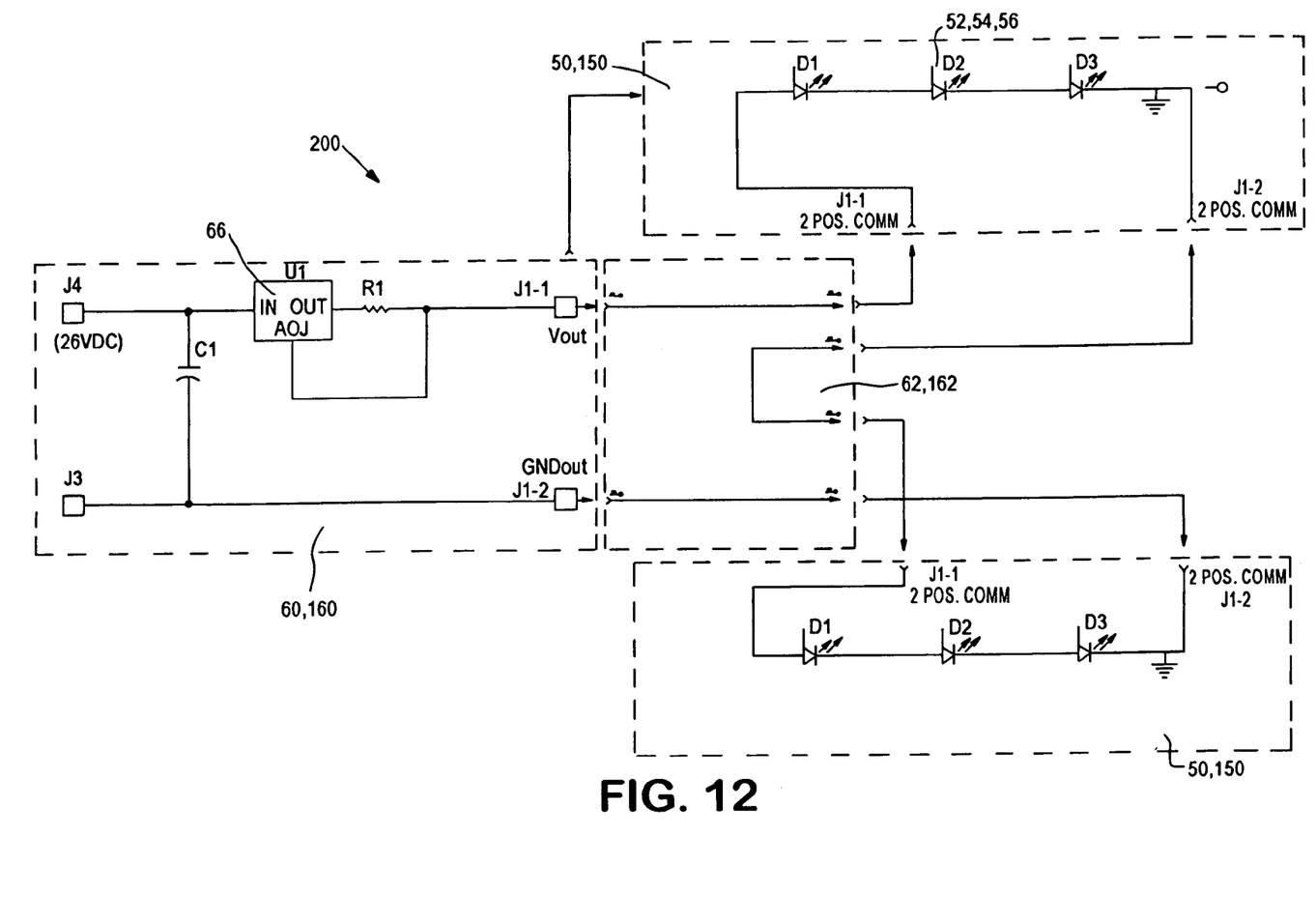
FIG. 12 is a schematic of a representative driver circuit for the light emitting units of FIGS. 1 and 9.

The driver PC board 60 includes circuitry for producing current pulses for energizing the LEDs. An exemplary driver circuit is illustrated in FIG. 12. An LM317S integrated circuit is configured as a constant current source to deliver approximately 350 mA to the LEDs. The LEDs are connected in series. The bottom of the support block and base plate define a cavity (shown in FIG. 11) for receiving the driver PC board 60. Rigid electrical leads 64 extending from the driver PC board 60 protrude through an aperture 48 in the support block 40 to engage the connector PC board 62. The integrated circuit 66 generates heat and is arranged with a heat transfer surface in thermally conductive contact with the support block lower surface (as shown in FIG. 11). A thermally conductive gasket 167 provides a thermal pathway between the integrated circuit 66 and the support block 40. In the illustrated embodiment fasteners extend through the driver PC board 60 to compress the PC board, integrated circuit 66 and gasket 167 against the thermally conductive support block 40 to enhance heat transfer. The cavity 170 for the driver board 60, 160 will typically be filled with potting material to seal the components against vibration and moisture intrusion. Electrical connections between PC boards 50, 150 connector PC board 62, 162 and driver PC board 60, 160 are soldered connections that are highly resistant to vibration.

The assembly is completed by installation of a gasket 30 and lens 20 that cover and seal the position light against the weather. The base plate 46 includes at least one aperture to relieve pressure beneath the lens 20. It will be noted that the base plate 46 extends radially beyond the support block 40 and is exposed to airflow around the aircraft. This support plate configuration provides a path for heat generated by the position light components to escape the assembly.

The resulting aircraft position light 10 is an extremely durable, energy efficient and low maintenance assembly that meets the requirements for an aircraft position taillight. Exemplary position taillight 10 has the further significant advantage that it emits little or no light in the NVG amplification spectrum and therefore does not blind NVG equipped aircrew. This reduces the temptation of aircraft employing NVGs to turn off position lights, enhancing the safety of civilian and military aircraft.

A second embodiment 100 of an aircraft taillight according to aspects of the present invention is illustrated in FIGS. 8–11. The principal difference between the taillight of FIGS. 1 and 2 and the taillight of FIGS. 8–11 is that the surfaces 142 bearing the PC board mounted LEDs are oriented to form a valley rather than a peak. This configuration addresses the need for a sharp cut off of light radiation at the outward lateral ends of the pattern illustrated in FIG. 6b. In the second embodiment 100, the support block 140 includes wings 180 projecting away from the base plate 146 along the outward sides of the valley supporting the PC boards 150. The wings 180 are positioned to block light from the LEDs 52, 54, 56 having a trajectory beyond the required cutoff at 70° to the right and left of the aircraft centerline. Up to the cutoff, the light from all the LEDs blends together to meet the radiation requirements for the taillight 100.

Figure 8:
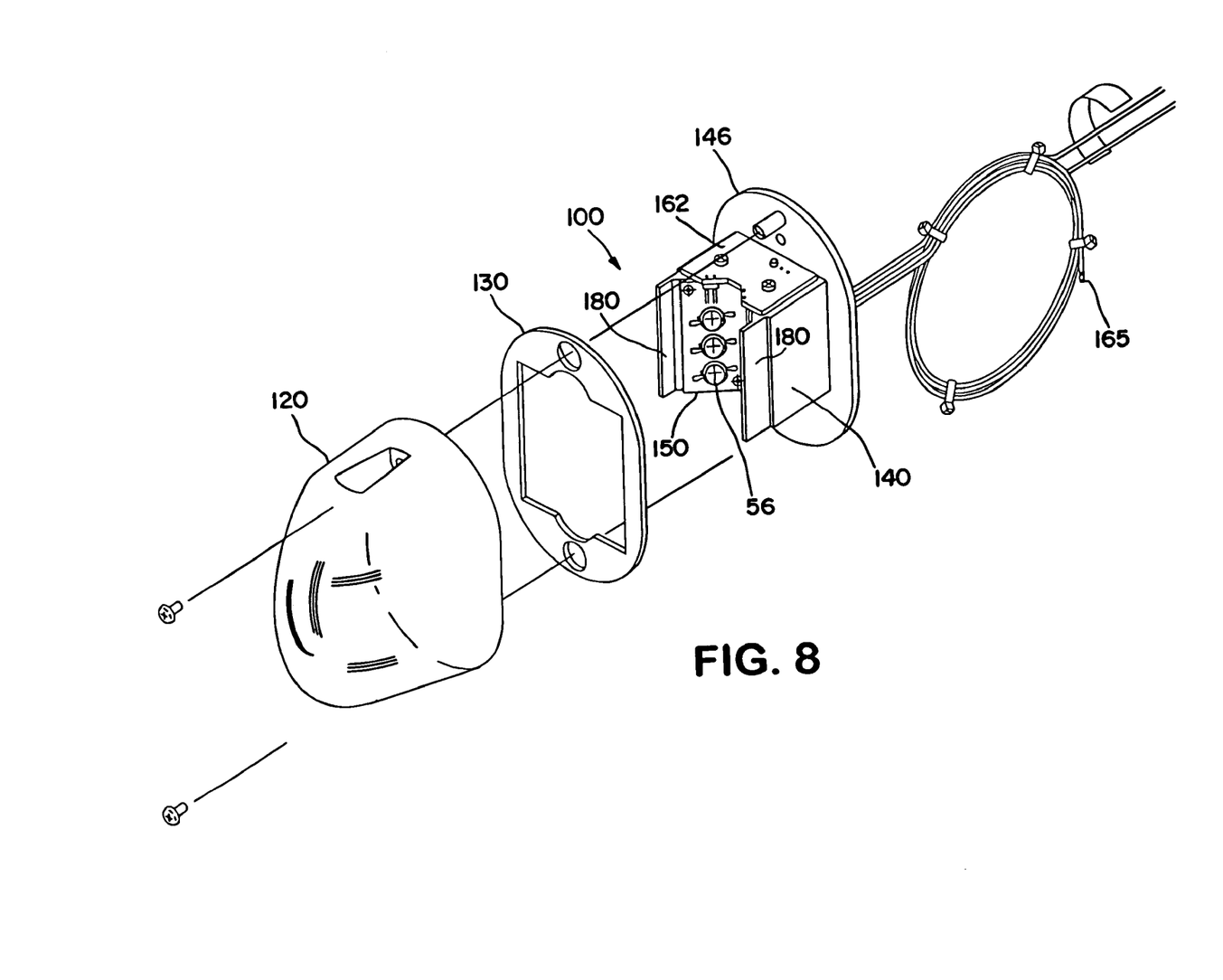
FIG. 8 is a partially exploded perspective view of an alternative aircraft taillight exemplary of aspects of the present invention.

FIG. 8 illustrates the lens 120 and gasket 130 that seal the outward part of the taillight 100 against the weather. A teflon tube 165 extends through the base plate 146 into the area covered and sealed by the lens 120 and gasket 130 to relieve pressure changes caused by changes in aircraft elevation. The connector board 162 has a configuration complementary to the valley shape of the support block 140. FIG. 10 is an end view of taillight 100 illustrating the included angle β of approximately 90° between surfaces 142. Electrical leads 164 from the driver board 160 extend through aperture 148 to meet connector board 162. The embodiment of the taillight illustrated in FIGS. 8–10 may employ white LEDs 56. The illustrated taillight 100 meets the FM light radiation requirements with only 6 (six) Luxeon™ emitters.

While exemplary embodiments of the foregoing invention have been set forth for purposes of illustration, the foregoing description should not be deemed a limitation of the invention herein. Accordingly, various modifications, adaptations, and alternatives may occur to one skilled in the art without departing from the spirit and the scope of the present invention.

What is claimed is:

1. An aircraft position light comprising:
   a support comprising adjacent, substantially planar surfaces defining a reentrant angle, said support defining an interior angle between said planar surfaces, measured within said support, greater than 180°;
   a plurality of LEDs mounted to each said planar surface; and
   a circuit for energizing said LEDs,
   wherein said LEDs produce light when energized in a pattern subtending an obtuse angle centered on a line bisecting said reentrant angle.

2. The position light of claim 1, wherein said interior angle is approximately 270°.

3. The position light of claim 1, wherein said reentrant angle is bisected by a plane and said support is substantially symmetrical on either side of said plane.

4. The position light of claim 1, comprising a plurality of thermally transmissive PC boards, intermediate each said plurality of LEDs and each said support surface.

5. The position light of claim 1, wherein said obtuse angle is approximately 140°.

6. An aircraft position light comprising:
   two substantially planar elongate PC boards;
   a linear array of LEDs mounted to each said PC board, each said LED having an optical axis, the optical axes of each said linear array collectively defining a direction of light transmission for each linear array; and
   a circuit for simultaneously energizing said LEDs,
   wherein said LEDs produce light when energized, said PC boards supported so that said linear arrays are substantially parallel and the direction of light transmission of said linear arrays intersect at an angle of approximately 90°.

7. The aircraft position light of claim 6, comprising a thermally conductive support to which said PC boards are secured.

8. The aircraft position light of claim 7, wherein said PC boards are thermally conductive and provide a thermal pathway from said LEDs to said support.

9. The aircraft position light of claim 6, wherein the plurality of LEDs mounted to said first PC board is substantially identical to the plurality of LEDs mounted to said second PC board.

10. The aircraft position light of claim 6, wherein each said PC board comprises a thermally transmissive substantially planar PC board and said position light comprises:
    a thermally conductive support, said support having a substantially planar surface for each of said PC boards, said planar surfaces adjoining along one edge to define an included angle between said planar surfaces.

11. The aircraft position light of claim 10, wherein said LEDs have a viewing angle and said viewing angle and said included angle result in a light radiation pattern from the position light extending over an arc of 140° in a first plane perpendicular to a second plane bisecting said included angle.

12. An aircraft position light comprising:
    a support defining two substantially planar surfaces adjacent to each other along one edge, said surfaces defining an included angle of less than 180°;
    a substantially planar, thermally conductive PC board mounted in thermally conductive relationship to each said planar surface,
    a plurality of LEDs mounted to each said PC board, each said LED having an optical axis, the optical axes of said plurality of LEDs collectively defining a direction of light transmission for each said plurality of LEDs;
    wherein the direction of light transmission of one said plurality of LEDs intersect the direction of light transmission of the other said plurality of LEDs.

13. The aircraft position light of claim 12, wherein said included angle is 90°.

14. The aircraft position light of claim 12, wherein said support is thermally conductive and said PC boards provide a thermal pathway between said LEDs and said support.

15. The aircraft position light of claim 12, the direction of light transmission of one said plurality of LEDs intersect the direction of light transmission of the other said plurality of LEDs at an angle of approximately 90°.

16. The aircraft position light of claim 12, wherein said LEDs have a viewing angle and said viewing angle and said included angle result in a light radiation pattern from the position light extending over an arc of approximately 140° in a first plane perpendicular to a second plane bisecting said included angle.

17. The aircraft position light of claim 12, wherein said PC boards extend in a longitudinal direction and said support comprises a projection extending from a laterally outward edge of each said planar surface, said projection configured to block light from said LEDs, thereby providing an angular limit to a light radiation pattern produced by said position light in a plane perpendicular to said projections.

18. The aircraft position light of claim 17, wherein said light radiation pattern subtends an arc of approximately 140° between said projections.

* * * * *